United States Patent

Chen

[15] 3,656,009

[45] Apr. 11, 1972

[54] NON-LINEAR TRANSMISSION LINE CURRENT DRIVER

[72] Inventor: Chung-Ho Chen, Plymouth Meeting, Pa.

[73] Assignee: Sperry Rand Corporation, New York, N.Y.

[22] Filed: Sept. 4, 1970

[21] Appl. No.: 69,836

[52] U.S. Cl. ..............................307/268, 307/106, 307/208, 328/56, 333/29, 340/174 TL, 340/174 VB

[51] Int. Cl. ..........................................................H03k 5/00

[58] Field of Search..................307/208, 268, 270, 106, 107; 328/56, 66, 67; 333/29; 340/174 TL, 174 VB

[56] References Cited

UNITED STATES PATENTS

| | | | |
|---|---|---|---|
| 3,383,526 | 5/1968 | Berding | 307/270 |
| 2,820,909 | 1/1958 | Plouffe, Jr. | 307/106 |
| 2,894,153 | 7/1959 | Glomb | 333/29 X |
| 3,200,265 | 8/1965 | Nagumo et al | 333/29 X |
| 3,252,100 | 5/1966 | Webb | 307/293 X |
| 3,302,035 | 1/1967 | Greene | 307/208 X |

*Primary Examiner*—Donald D. Forrer
*Assistant Examiner*—R. C. Woodbridge
*Attorney*—Charles C. English, Rene A. Kuypers and William E. Cleaver

[57] ABSTRACT

There is disclosed herein an arrangement for developing a fast rise time current pulse in a transmission line. The pulse is produced in the line in steps until the final value of current is reached. By developing the drive current in incremental steps undesirable overshoot is eliminated.

10 Claims, 2 Drawing Figures

Patented April 11, 1972 3,656,009

INVENTOR
CHUNG-HO CHEN

BY Rene A. Kuypers
ATTORNEY

NON-LINEAR TRANSMISSION LINE CURRENT DRIVER

BACKGROUND OF THE INVENTION

1. Field of the Invention

This invention is related to the field of transmission lines and in particular to the art of forming fast rise time pulses therein.

2. Description of the Prior Art

For an ordinary transmission line termination using a resistance equal to the characteristic impedance of the transmission line, it would require a voltage at the source of $IZ_0$ where I is the operating current and $Z_0$ is the characteristic impedance of the transmission line. In a known prior art plated wire memory arrangement, this would require a voltage drive of approximately 50 volts assuming a $Z_0$ of 50 ohms and a drive current of 1 ampere.

The above-stated parameters produce serious shortcomings in a plated wire memory that must operate in a computer that has a nanosecond cycle time. Thus, a high voltage swing in the plated wire word strap results in high coupling noise in the plated wire memory element (i.e., the bit line). This noise is due to capacitive coupling that exists at the orthogonal intersection of the plated wire and the word strap. In a known memory plane, a voltage swing of 50 volts will result in noise in the bit line of approximately 30 millivolts. Such a noise level would have a tendency to mask the actual signal being read out of the memory.

Another shortcoming of using an ordinary transmission line termination resistor equal to the characteristic impedance for the drive line of a wire memory is that the $Z_0$ would have a conservative value of 50 ohms. At a required drive voltage and current of 50 volts and 1 ampere, respectively, and for a 50 percent duty factor, the power dissipation would be 25 watts. This may be lowered somewhat by various expedients but this figure is relatively close for later comparison purposes. In any event, it can be readily appreciated that if every word line in a plated wire memory were so terminated, not only would there be a large space utilization due to the size of such a resistor but furthermore there would be great heat dissipation.

Finally, it can be recognized that if there is a requirement for a high drive current into the transmission line, then a transistor required to produce this current must have a high voltage, high power dissipation and high speed rating.

SUMMARY OF THE INVENTION

A non-linear transmission line current driver is disclosed which essentially comprises a constant current and a constant voltage source connected together at the source. A resistance equal to the characteristic impedance is connected to the line at the source end. The transmission line is arranged so that a build-up of current is obtained incrementally by reflecting a current and voltage wave between a permanent or terminal short circuit connected to the end of the line and a temporary or initial short circuit connected to the beginning of the line.

The initiating current pulse down the line upon reflection from the terminating short circuit does not reach the final value of current so that there is a second reflection from the initial short circuit. The re-reflected wave is again reflected from the terminating short circuit back to the source where it is terminated by means of the characteristic impedance and the initial short circuit is removed. By reflecting the current and voltage waves between the initial and terminating short circuits there is a gradual build-up of current in the transmission line and results in a waveform without deleterious overshoot.

Accordingly, it is an object of this invention to provide a new and improved transmission line current driver.

It is a further object of this invention to provide a new and improved transmission line current driver to develop a fast rise time, high current pulse without overshoot caused by reflections.

Figure 1:
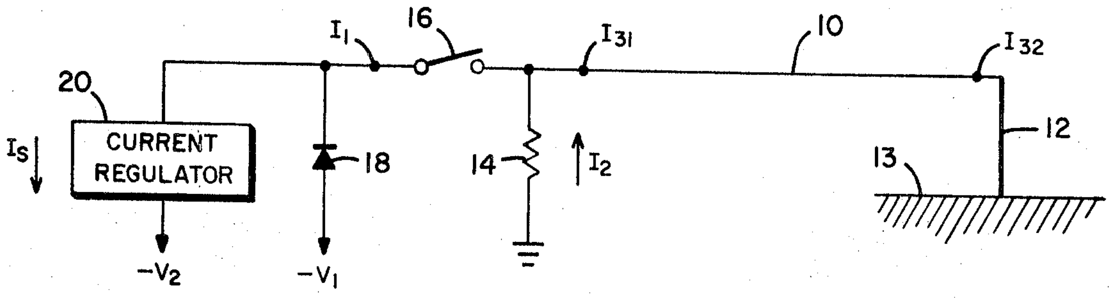
FIG. 1 depicts a preferred embodiment of the invention.

Referring now to the drawings and in particular to FIG. 1, there is depicted in a preferred embodiment of the invention a portion of a plated wire memory arrangement for use with a digital computer. The portion of the memory comprises the word strap or solenoid 10. The word strap 10 is conventionally a 15-mil wide and thin copper strap formed by printed circuit techniques on a plastic base (not shown) such as Mylar and in the invention under discussion comprises the transmission line. In a conventional plated wire memory device, a plurality of such copper straps or word strap 10 are formed in parallel on 30-mil centers. Positioned orthogonally to the word strap 10 are 5-mil diameter magnetically plated wires. The operation and organization of this type of computer memory will not be gone into great detail since such a memory is well documented in the prior art. Therefore, for further discussion relating to the operation of a plated wire memory reference may be made to patents U.S. Pat. Nos. 3,370,929 and 3,465,312.

The word strap 10 may be a half-turn or full-turn configuration and is depicted in FIG. 1 as a half-turn. In other words, the half-turn solenoid comprises a line 10 extending from the electronics 14, 16, 18, 20 to the right where it is terminated in a ground connection 12 to the ground plane 13. The ground plane 13 is a large metal conductor which is juxtaposed to the word strap 10. In the particular embodiment under discussion, the word strap is approximately 21 inches long.

The electrical components connected to the left hand side of the word strap 10 or transmission line comprise a resistor 14 one end of which is connected to ground potential. The resistor 14 has a value which matches the characteristic impedance of the line and is therefore conventionally referred to as $Z_0$. It should be noted here that the resistance 14 equal to the characteristic impedance is not positioned at the end of the line 10 but rather at the beginning of the line. The characteristic impedance $Z_0$ of a transmission line is well known and may be conventionally defined as that one particular load impedance that is connected to a theoretically infinite transmission line and which assumes the same value as the input impedance.

The non-linear driver for the transmission line 10 is composed of a constant voltage source and a constant current source. The constant voltage source comprises a voltage $-V_1$ connected to the anode of diode 18. The cathode of the diode is connected to one side of switch 16. The switch 16 is shown in simplified form as a single pole – single throw type for ease of explanation, but in an actual embodiment comprises a transistor circuit which operates in either an ON or an OFF mode. The voltage produced by the above-discussed source is constant at the switch 16 since the voltage drop through the diode 18 is small and relatively constant for a certain current flow.

The constant current source, which produces the current $I_s$, is shown connected on the same side of the switch 16 as the constant voltage source and comprises a current regulator 20 which in turn is connected to another voltage $-V_2$. The current regulator is well known in the art and therefore will not be further discussed. In an actual memory embodiment, $-V_1$ is approximately 20 volts negative.

In the quiescent state (i.e., switch 16 is open), a current $I_s$ flows from the voltage $-V_1$, through the diode 18 (the anode of the diode being more positive than the cathode), through the current regulator 20 in the downward direction shown by the arrow to the voltage $-V_2$.

When the word line 10 is to be energized, the switch 16 is closed thereby causing other currents to flow. Thus, the current $I_2$ flows from the grounded end of the resistor 14 through the current regulator 20 to the voltage source $-V_2$. This current flow may be viewed by referring to FIG. 2 wherein it is seen that the current $I_2$ has a unit of current i $(-V_1/Z_0)$ flowing therein since the closing of switch 16 causes the voltage $-V_1$ to appear across resistor 14. In addition, a current $I_{31}$ (see FIG. 2) flows from the ground end 12 of the line 10 to $-V_2$ and also has a value of *i* since it has an impedance of $Z_0$ and the voltage $-V_1$ is applied thereto. The current flow will not be to $-V_1$, in view of the poling of the diode 18. It should therefore be noted that $$I_2 + I_{31} = I_1$$

and $$I_1 = I_s \text{ (only when diode 18 is not conducting).}$$

Accordingly, as the switch 16 is closed and since the diode 18 is conducting, the transmission line or word strap 10 sees a voltage $-V_1$. The voltage at switch 16 is $-V$ volts since the current through diode 18 produces an insignificant voltage drop therethrough. Since the line 10 sees the voltage $-V_1$ and the characteristic impedance is $Z_o$, a current step $-V_1/Z_o$ or i moves down the line in a left to right direction.

It should be noted hereat that although the current wave $I_{31}$ moves from left to right, the actual current in the transmission line moves in a leftward direction (assuming the convention that current moves from plus to minus). The actual current begins to flow in a leftward direction in step with the current wave since the line 10 is coupled to the ground plane 13 (which has a ground potential) via the distributed capacitance (not shown) whereas the voltage at the switch 16 is $-V$ as previously stated. In summary therefore, the voltage and current waves in the transmission line 10 are moving rightwardly and the actual current is moving leftwardly from plus to minus polarity.

As the current wave $i$ and the voltage wave $-V_1$ travel down the transmission line 10 in phase they finally reach the permanent short circuit 12. The high current in the short circuited end of the line potentially represents energy and because this energy exists across a zero impedance which cannot absorb it, the only place this energy can go is back along the line toward the source. Accordingly, the voltage wave $-V_1$ and the current wave i are reflected back toward their sources. However as is well known in the transmission line art, the phase of the voltage wave is reversed 180° so that $-V_1$ returns down the line to the source as $+V_1$. In other words, the voltage across the short circuit 12 is zero since the incident wave ($-V$) and the reflected wave ($V$) add up to a null. Mathematically, the reversal of phase of the voltage can be shown by the reflection coefficient, $p$, wherein $$Pv = (R - Z_o)/(R + Z_o)$$

and $P_v = -1$ since R equals 0 (i.e., R is a short circuit).

The current i is also reflected from the end of the transmission line as stated above but the phase is not reversed since mathematically the coefficient of reflection for current is $$P_c = -P_v$$

Therefore, the magnitude of the current in the short circuit 12 is doubled since as stated above the energy in the short circuit 12 is not dissipated and therefore adds to the existing current $i$. This can be seen by referring to FIG. 2 wherein after a time delay of $t_d/2$ (i.e., the time required to reach the end of the line from the source), the current $I_{32}$ is shown to have an amplitude 2i.

A mode of operation is now described whereby $$I_s = 3i = 2i + i$$

Continuing now with the description of the operation, it will be recalled that the current after reflection in line 10 is $2i$ (i.e., i reflected plus $i$ produced by $-V$).

Let us assume that the reflected i above as it travels back to the source would be fully reflected by another short circuit comprising the conducting diode 18. In this eventuality, the reflected wave $i$ would become $2i$ and when added to the existing current $I_1$ (i.e., $2i$) would total $4i$. This is not possible since the total current $I_s$ produced by the current and voltage sources is only $3i$ as above stated.

The reflected wave i is therefore divided into $i/2$ which sees the short circuit (i.e., conducting diode 18) and $i/2$ which sees the terminated line 10 via the impedance 14.

The current $i/2$ which sees a short circuit is therefore doubled and becomes i. By referring to FIG. 2 it can be seen that the total $I_1$ current is now at $3$i.

The current $I_{31}$ which had an original value of $i$ upon the application of $-V$ to the line 10 is raised to $2i$ by the fact that reflected $i/2$ seeing a short circuit because of the conducting diode 18 and is doubled to become $i$. This is added to original $i$ and produces a total of $2i$. Also added to the current $I_{31}$ is the reflected $i/2$ which sees the characteristic impedance 14 and therefore is terminated without further reflection. By referring to FIG. 2 it can be seen that after one round trip $t_d$ in the transmission line the current $I_{31}$ is raised to $2½i$.

It should now be noted that since $I_1 = I_2 + I_{31}$ as above stated, and $I_{31} = 2½i$ and $I_1 = 3i$, then $I_2$ must equal $i/2$. In other words, the current in the characteristic impedance is reduced in value during the build-up of current in the line.

As the re-reflected wave $i/2$ travels down the transmission line 10 toward the short circuit 12, it is again re-reflected and thereby doubles in magnitude to become i. Accordingly, $I_{32}$ now increases to $3i$.

The re-reflected wave $i/2$ travels back to the source where it sees the diode 14 no longer conducting since the current $I_{31}$ in the transmission line 10 now has a value of $3$i (i.e., 2½i + /2) and therefore $I_s = I_1 = I_{31}$. The current $I_2$ in view of the above relationship drops to zero (see FIG. 2).

The above operation may be summarized in the following manner. As the switch 16 is closed, since the diode 18 is conducting, the transmission line 10 sees a voltage source $-V$. Therefore, a current step of $-V/Z_o$ travels down the line and finally a current step of $-2V/Z_o$ appears at the grounded end 12. As the reflected wave arrives back at the driving end, the current through switch 16 increases to nearly final value $I_s$ and only a fraction $i/2$ of the reflected wave is re-reflected. When this fractional part $i/2$ arrives at the grounded end 12 the current increases to the final value and the last reflected wave from the grounded end 12 sees a terminated transmission line and also increases the current at the driving end of the line to the final current $I_s$.

The invention has been described in accordance with an embodiment whereby the approximate desired current in the line 10 is achieved after one reflection (i.e., the current $I_{31}$ is $2½i$ after one reflection), however, it should be understood that the invention is not so limited. Thus, the current wave may be re-reflected several times until the value of $I_s$ is achieved. In other words, the diode 18 will remain conducting until the $I_{31} = I_1 = I_s$. Therefore, until this equation is satisfied the voltage and current wave fronts continually see a short circuit at either end. When the final value of current is achieved in the line, the re-reflected wave see the characteristic impedance $Z_o$ (i.e., resistor 14) since the diode 18 is disconnected.

Figure 2:
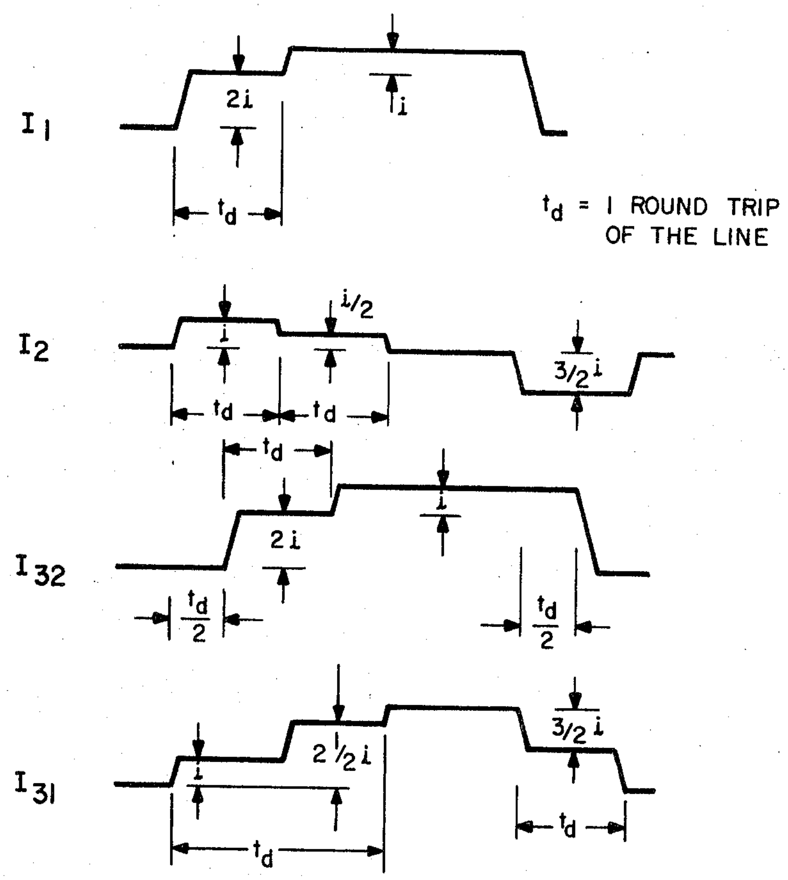
FIG. 2 depicts the development of the waveform down the transmission line.

It should be noted from FIG. 2 that the leading edge of the current $I_{31}$ developed in line 10 is accomplished in incremental steps. By developing the leading edge of current in this manner, overshoot is eliminated. Thus in an actual embodiment, for a current $I_{31}$ having an approximate pulse width of 100 nanoseconds, the rise time has been 15 nanoseconds without any overshoot.

The termination of the signal in FIG. 2 or the fall time is developed in a similar manner to the aforediscussed development of the rise time. Thus when the switch 16 is opened, $I_1$ immediately returns to 0 as can be seen by referring to FIG. 2. Accordingly, a wave $-I_s$ is generated since $-I_s + I_s = 0$. Since the wave $-I_s$ sees the same impedance $Z_o$ in the line 10 and the resistor 14, the current wave is divided into $-I_s/2$ and travels simultaneously into both the resistor and the line. The wave $I_{31}$ in FIG. 2 is shown to immediately drop to the value shown since $I_s/2$ equals $3i/2$. The current $I_2$ is shown in FIG. 2 to change as shown since $-I_s12$ equals $-3i/2$.

When the wave $-I_s/2$ reaches the short circuit 12, it is doubled and becomes $-I_s$. Therefore, the current wave $I_{32}$ drops to 0 after a time $t_d/2$ since $-I_s + I_s = 0$. The wave $-I_s/2$ is reflected back to the source and when added to the original $-I_s/I_{31}$ becomes $-I_s$ or $-3i$. By referring to FIG. 2 it can therefore be appreciated that it takes a time period of $t_d$ for the wave $I_{31}$ to return to 0.

The wave $-I_{s/2}$ therefore sees the characteristic impedance 14 and therefore is terminated. The current in the resistor 14 returns to 0 in the following manner. The initial current $-I_{s/2}$ after the opening of the switch 16 flows downwardly in resistor 14 since the voltage wave momentarily is positive at its upper terminal since it must be of opposite polarity to the applied voltage $-V_1$. Upon reflection from the short circuit 12, this wave returns to the source (i.e., the upper terminal of resistor 14) as $-V$. The reflected current $-I_{s/2}$ therefore generates an actual current in the termination resistor 14 that flows upwardly and cancels the existing current flowing downwardly. This occurs after a period $t_d$ as shown in FIG. 2.

The present invention in view of the manner in which current $I_2$ is reduced to one-half and then to 0 in the resistor 14, it is readily apparent that the power expended therein is substantially reduced and hence, the heat dissipation and space requirements are minimal. Thus, it will be recalled that for known prior art termination of the line 10, it was estimated that the power expended would be 25 watts. However, the 50 (i.e., $I_sZ_0$) volt drive voltage is now reduced to 25 volts or less since if in our example i equals 1 ampere, then after 1 reflection of the short circuit 12, the current $I_{32}$ is 2 amperes and the current $I_2$ is 1 ampere making a total of 3 amperes which is impossible. There *i* must equal 0.5 amperes. In other words, in this invention the driving voltage is always equal to or less than $I_sZ_{0/2}$ since $I_s$ $2V/Z_0$. Accordingly, the driving voltage is reduced to one-half that required of the prior art or 25 volts. This, of course, lowers the voltage swing of the driving transistor.

Furthermore, since the driving voltage is reduced by one-half, the power dissipated in resistor 14 is now only one-half watt since $Z_0$ is in parallel with the line as opposed to the prior art $Z_0$ being positioned in series with the line.

The embodiments of the invention in which an exclusive property or privilege is claimed are defined as follows:

1. The method for producing a current wave in a conductive line wherein its receiving end is directly connected to ground potential and its sending end is connected to a constant current source, a resistance which is equal to the characteristic impedance of said line, and to a constant voltage source through a diode comprising the step of reflecting said current wave between two short circuits provided by the forward conduction of said diode and said ground.

2. The method of producing a current in a conductive line in accordance with claim 1 and further including the step of disconnecting said diode after the current in said line has substantially reached its final value.

3. A combination for producing current comprising,
   a. a conductive line having a receiving and sending end, said receiving end of said line being terminated in a short circuit by a direct connection to ground potential,
   b. a constant voltage source,
   c. a constant current source,
   d. a resistor having a value approximately equal to the characteristic impedance of said line,
   said two sources and said resistor being coupled to the sending end of said line for incrementally producing a current in said line.

4. The combination in accordance with claim 3 wherein a normally open switch means is interposed between said two sources and said resistor.

5. The combination in accordance with claim 3 wherein a diode means connected to a DC voltage comprises said constant voltage means.

6. The combination in accordance with claim 3 wherein said conductive line comprises the word solenoid of a plated wire memory arrangement.

7. The combination in accordance with claim 4 wherein said normally open switch is closed to cause a current wave to be produced in said line,
   said current wave being reflected by said short circuit back to said source, and
   a portion of said reflected wave being re-reflected by said conducting diode and another portion of said reflected wave being terminated by said resistor,
   said re-reflected wave being further reflected by said short circuit and after re-reflection being terminated at said source by said resistor.

8. The combination in accordance with claim 3 wherein a ground plane is juxtaposed to said conductive line.

9. The combination in accordance with claim 4 wherein said switch means comprises a semiconductor device.

10. The combination in accordance with claim 3 wherein said conductive line is approximately 21 inches long.

* * * * *